Feb. 11, 1930.　　　　　　　J. SNEED　　　　　　1,746,719
FLEXIBLE CONDUIT
Original Filed Aug. 19, 1925　　2 Sheets-Sheet 2
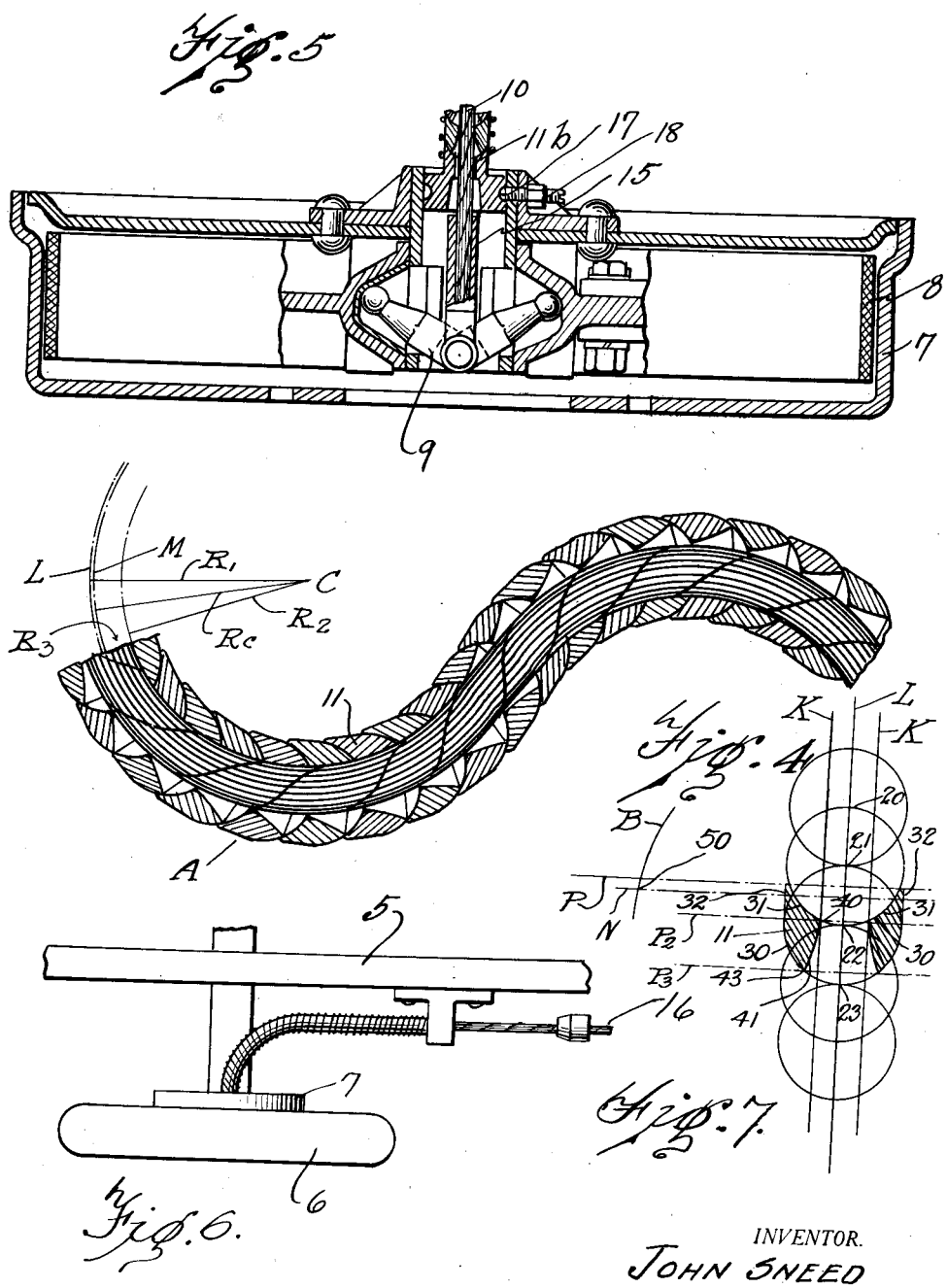
INVENTOR.
JOHN SNEED
BY
Rex Frye.
ATTORNEY.

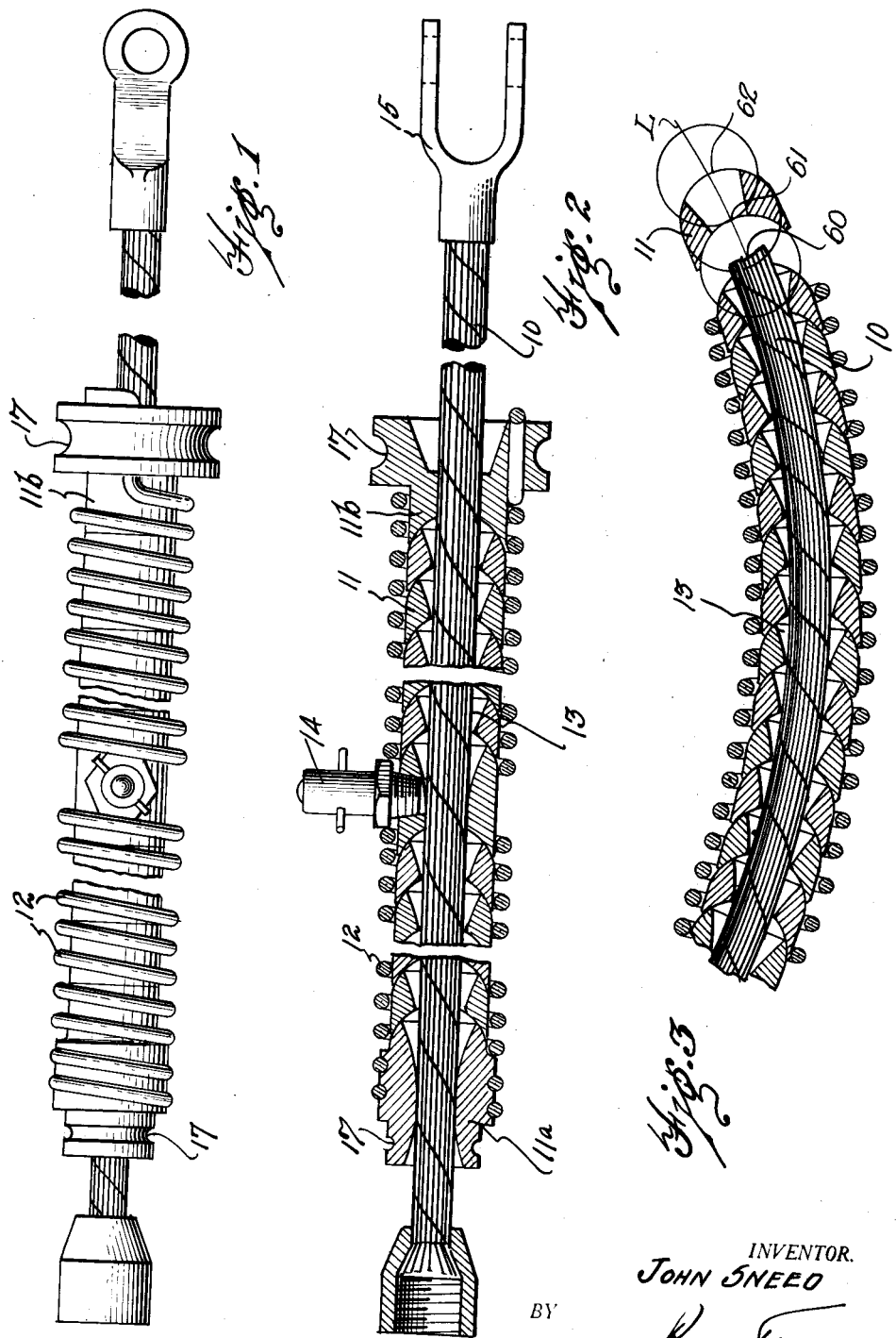

Patented Feb. 11, 1930

1,746,719

UNITED STATES PATENT OFFICE

JOHN SNEED, OF DETROIT, MICHIGAN, ASSIGNOR TO STEELDRAULIC BRAKE CORPORATION, OF DETROIT, MICHIGAN, A CORPORATION OF MICHIGAN

FLEXIBLE CONDUIT

Application filed August 19, 1925, Serial No. 51,094. Renewed March 5, 1928.

This invention relates to flexible conduits, and more particularly to conduits for guiding the longitudinal movements of flexible cords, wires, cables or the like, as for example, in actuating vehicle brakes.

The principal object of my invention is the provision of a flexible conduit wherein the length of the cable, etc., housed thereby remains constant in all positions of curvature assumed by the conduit. It is a well known fact that practically all of the flexible conduits now in use have a tendency to creep upon the cable as the conduit is bent, this being occasioned by the inability of the portions of the links adjacent the inner periphery of a curve to crowd together to the same extent as the portions adjacent the outer periphery separate. In other words, my invention has for one of its objects a construction wherein the longitudinal axis of the conduit in curvature will have the same overall length as the longitudinal axis of the cable or the like housed therein.

Another object of my invention is the arrangement of interfitting links to form a flexible conduit capable of bending in any direction and formed with central sockets therethrough, having curved walls adapted to provide increasing contact with the cable, etc., passing through the conduit in proportion to the degree of departure of the conduit from straight line position.

The above and other objects will be apparent from the following description, wherein reference is made to the accompanying drawings illustrating a preferred embodiment of my invention and wherein similar reference numerals designate similar parts throughout the several views.

In the drawings:

Fig. 1 is a plan view of my improved flexible conduit in position upon an actuating cable for vehicle brakes.

Fig. 2 is a central vertical section therethrough.

Fig. 3 is an enlarged detail sectional view showing the positions assumed by the conduit when bent on a curve of comparatively large diameter.

Fig. 4 is a similar view showing the positions assumed by the conduit when bent to a figure S curve having comparatively short radii.

Fig. 5 is a detail sectional view through a vehicle brake arranged to be actuated by the cable housed in my improved flexible conduit, and Fig. 6 is a plan view showing a preferred arrangement of my flexible conduit upon a vehicle chassis.

Fig. 7 is a diagrammatic sketch showing the geometrical structure and arrangement of the links comprising the conduit.

Referring now to the drawings, the numeral 5 designates a chassis of any desired shape or size, equipped with wheels 6 of the usual or any desired type. Since the application of my invention to the actuation of vehicle brakes is but one adaptation of its use, no attempt has been made herein to illustrate or describe a completely operative driving or steering mechanism for the wheel 6, it being understood that the showing herein is merely for purposes of exemplification of the manner of mounting my improved flexible conduit. The wheel 6 is adapted to carry a brake drum 7 of any desired type for cooperation with the brake shoe 8, whenever the brake shoe is expanded into engagement with the brake drum by the straightening movement of the toggle levers 9. In the illustrated embodiment I have shown the cable 10 adapted to be housed within my improved flexible conduit in position to actuate the toggle levers 9 and so apply the brakes whenever desired (note Fig. 5).

The conduit forming the claimed disclosure herein comprises a plurality of interfitting links 11 arranged substantially as shown in Figs. 1 to 4 and 7 and is surrounded by a coil spring 12 which is extended in tension and secured to the ends of the conduit and serves the double purpose of compressing the links upon each other, and distributing inter-link movement to give smooth and even curvature of the conduit. The coil spring 12 is secured at its extremities to the end links of the conduit in any desired manner, and intermediate its ends the coils are spaced from each other by reason of the tension and permit movement of the coils toward each other on the inner periphery of a curve in the conduit as well as to separate at the outer periphery of such curve. As herein shown, I have provided one end link $11^a$ with external spiral grooves for the reception of the spiral spring 12, and an end link $11^b$ having provision for the reception of one end of the spring 11 into an aperture formed in such link. One of the links $11^a$ or $11^b$ is formed with a convex spherical extremity and the other with a concave spherical extremity so that these links will readily fit over and into the opposite extremities of the intermediate links of my flexible conduit. As shown particularly in Figs. 1 and 2, both of the end members $11^a$ and $11^b$ are provided with an outer annular groove 17. Referring also to Fig. 5, it will be seen that a set screw or similar device 18 is carried by a fixed part of the brake and extends into the groove 17 to secure the end member $11^b$ in a fixed position relative to the body of the brake. Referring also to Fig. 6, it can be understood, although it is not shown, that the end member $11^a$ may be secured in a similar manner to the bracket or other means which is carried by the frame of the vehicle. Thus, the end members $11^a$ and $11^b$ serve a double function of first securing the opposite ends of the spring 12, and of being secured to relatively fixed points between which force is transmitted by the assembled conduit and cable.

Each of the intermediate links 11 are constructed with their opposite ends shaped with concave and convex spherical walls having the same radii and joined by a central flaring socket or aperture formed with its wall curved on an arc of a circle having a radius $R^2$ as indicated in Fig. 4. In Fig. 4, a portion A of the assembled links and cable is shown to be curved about a center C. The longitudinal axis L of the assembled links 11 is shown to be extended in a continuing curve and can be seen to be struck from the center C with a radius indicated $R^1$. The radius of curvature of the cable $Rc$ is slightly less than the radius $R^1$, due to clearance to be mentioned below, so that the extended axis of curvature of the cable may be indicated M on a slightly smaller arc than the arc of the axis L. The cable itself has a radius $R^3$ so that the radius of curvature of the inner side of the cable, equals the radius $R^2$, which is also the radius of curvature of the walls of the sockets or apertures formed in each of the links or units 11. Thus the radius of curvature of the walls of the socket can be expressed with substantial accuracy as being the minimum radius of curvature of the axis of the conduit less the radius of the body of the cable. This formula is built on the premise that the diameter of the cable equals the minimum diameter of the aperture. In practice, there is of course, a certain clearance or tolerance which must be allowed between the cable and conduit. In addition to the said clearance, the theoretically sharp edges which are formed between the conical socket and the concave wall of the link are rounded slightly so that to that extent some leeway is allowed in employing the above formula. It will appear therefore, that in designing a conduit, I use as my premises first the desired minimum radius of curvature, second the necessary size of cable, and third the corresponding necessary compressive strength and size of the assembled conduit units or links. In the illustrative embodiment of my conduit shown herewith, I have chosen to design the radius $R^2$ i. e. radius of curvature of the walls of the socket to be substantially three times the radius of curvature of the end walls of the links or units.

Referring particularly to Fig. 7, I show diagrammatically the manner in which the several links are formed, and the geometrical relation of the several surfaces. The line L may represent the longitudinal axis of the conduit in straight line, and the lines K may designate a longitudinal cylinder including the least circles of the sockets or apertures, which substantially define the walls of the cable. Beginning with the point 20, I strike a circle having a radius equal to the radius of curvature of the end walls of the links. At the point 21 where this circle intersects the line L, I strike another circle with the same radius and continue to strike circles in a similar manner from centers 22, 23, etc. I design a given link by letting the circles represent spheres and using part of the spherical surface struck from the center 22 to form the convex wall of a link along the lines 30. The concave end wall of the link or unit is shown in Fig. 7 to conform with the circle struck from the center 21 along the lines 31 of the link. In the preferred form shown herewith, the side wall 32 lies in a cylinder which is tangential to the spheres struck from the centers 21 and 22. The side wall terminates in a brim in a plane P which is normal to the axis of the conduit L at a part spaced between the centers 21 and 22. The body of the unit 11 is mainly contained within the sphere struck from the center 22, but that portion adjacent the brim lies outside of both the sphere struck from the center 22 and the sphere struck from the center 21.

It will be noted that the lines K intersect the concave end walls 31 at points 40. To strike the curve of the side wall of the socket or aperture, I use the point 40 as a center and with the radius $R^2$, mentioned above, strike an arc B to intersect a line N, which is the perpendicular bisector of that portion of the line of the axis of the unit lying between the centers 21—22 in the line L. The intersection of the line N and the arc B, determines a point 50 and from the point 50 with the radius $R^2$, I describe an arc which determines the line 41 which generates the side wall of the socket. The point 40 lies in a plane P², which plane includes the circle of intersection of the concave end wall, and the socket or aperture. The line 41 intersects the convex end wall at the point 43 so that the plane P³ includes the point 43 and is normal to the axis L, and thus includes the larger circle of intersection of the aperture with the convex end wall of the conduit.

Referring also to Fig. 3, the curved axis of the conduit is shown to be extended and similar circles are shown to be struck along that axis about centers 60, 61 and 62. An illustrative conduit unit is set apart on the circles struck from the centers 60 and 61. The circles are of course of the same diameter as the circles drawn in Fig. 7, but one skilled in the art will appreciate that the shortest distance between the centers 60 and 61 equals the distance between the centers 21 and 22, see Fig. 7. However, the arcuate distance 60—61 is slightly greater than the cord 60—61. To this extent, there is a theoretical change in length between the cable and the conduit when the conduit is curved to the effect that more cable is included within the conduit. However, as mentioned above, there is a certain clearance between the cable and the inner surfaces of the conduit units so that, as shown in Fig. 4, the axis of the conduit L is on a slightly greater radius than the axis of the cable M. When the cable is in tension and the conduit in curvature therefor, the cable lies in an arc of slightly smaller radius than the arc of the longitudinal axis of the conduit and for this latter reason there is a theoretical change in length between the cable and the conduit when the conduit is curved to the effect that less cable is included in the conduit. It will be seen therefore, because of these opposite effects that there is a compensation between them and in practice the ends of the cable do not change their position with regard to the ends of the conduit during curvature.

Referring back to the apertures or sockets 13 formed in each of the links 11, it will be seen that each of these apertures present a curved wall to the surface of the cable, etc., passing therethrough regardless of the position of the link relatively to its companion links in the conduit. By virtue of this arrangement the cable 10 is always provided with a comparatively frictionless contact surface whenever it engages the conduit. Moreover the arrangement is such that when the conduit is in a substantially straight line position a minimum surface of the conduit is engaged by the cable, and as the conduit is bent a gradually increasing guide surface is presented, without however, any sharp corners or friction producing portions. When the conduit has been bent on a curve substantially equal to the radius on which the socket walls are formed, the lower surface of the guide sockets will be substantially continuous (note Fig. 4), and at all intermediate curves from the position shown in Fig. 4 to a straight line position, as for example as shown in Fig. 3, lesser extents of surface of the sockets will be engaged by the cable 10 in its longitudinal movements. The end link 11ª having the convex end wall is formed with a curved socket, but the end wall 11ᵇ having a concave extremity need not be so formed in the particular adaptation shown herewith.

One of the links may carry means for conveying lubricant to the interior of the conduit, as for example the alemite coupling 14.

In practice, the cable 10 is passed through the aligned sockets of the conduit links and its ends secured to junction members 15. In the illustrated embodiment one of the junction members is formed as a yoke for engagement with the central portions of the toggle levers 9 and the other extremity with a threaded sleeve adapted to be fitted on to the threaded extremity of the pull rod 16, whereby connection is made with a brake actuating pedal or lever (not shown). Whenever the pull rod 16 is pulled forward the cable 10 will be simultaneously moved, and slides within the sockets 13 of the several links; and the reverse movements occur when the pull rod is returned to its normal position. The flexible conduit is preliminarily shaped to any desired position and the end links secured in any suitable manner. The intermediate links 11 move upon each other to assume the desired positions of curvature, and the spring 12 bends to the desired shape and maintains the links in such shape until one of the end links is released. Since only the end links are secured, it will be obvious that the intermediate links are free to move upon each other in conformity with changes in position of the members to which the end links are secured, as for example when the vehicle wheel vibrates relatively to the vehicle chassis.

The bending of my improved flexible conduit does not increase nor shorten its coverage of the cable passing therethrough, for the reasons mentioned above for the reasons that the portions of the intermediate links on the under side of a curve are free to move to precisely the same extent as the portions of the links adjacent the outer side of the curve, whereby no relative change in position of the links is secured. Tests have been made by coloring the cable where it protrudes from the flexible conduit when the conduit is in a straight line position, and then bending the conduit in various ways. Regardless of the extent of the curvature or the number of reverse curves the colored portions of the cable do not change their positions relatively to the end links, until a pull or push is given to the cable exteriorly of the conduit.

It will be obvious that my flexible conduit is adapted for use with other devices than vehicle brakes, and I desire it understood that the illustration and description herein is not intended to limit the application of my invention. Again the central sockets 13 of the conduit links may be covered so as to prevent the admission of dust, moisture or the like, to the cable, and lubricant may be readily retained within the conduit.

While it will be apparent that the illustrated embodiment of my invention herein disclosed is well calculated to adequately fulfill the objects and advantages primarily stated, it is to be understood that the invention is susceptible to variation, modification and change within the spirit and scope of subjoined claims.

Having described my invention I claim:

1. A flexible conduit comprising a pair of end links, one having a convex spherical end wall and the other a concave spherical end wall, and interfitting intermediate links each having its opposite ends formed with convex and concave spherical walls and a central substantially conical socket for the reception of a cable passing through the conduit, the several links being flexibly interconnected by a member separate from the cable housed therein and freely moveable upon their adjacent links whereby the length of the cable housed by the conduit will remain constant regardless of the curvature of the conduit.

2. A flexible conduit comprising a pair of end links, one having a convex spherical end wall and the other a concave spherical end wall having substantially the same radius, and interfitting intermediate links each having its opposite ends formed with convex and concave spherical walls having substantially the same radius as the said end walls of the end links, and a central substantially conical socket for the reception of a cable passing through the conduit, the several links being flexibly interconnected by a member separate from the cable housed therein and freely moveable upon their adjacent links whereby the length of the cable housed by the conduit will remain constant regardless of the curvature of the conduit.

3. A flexible conduit comprising a pair of end links, one having a convex spherical end wall and the other a concave spherical end wall, and interfitting intermediate links each having its opposite ends formed with convex and concave spherical walls and a central substantially conical socket for the reception of a cable passing through the conduit, the several links being unattached and freely moveable upon their adjacent links whereby the length of the cable housed by the conduit will remain constant regardless of the curvature of the conduit, and an encircling coil spring connected to the end links and arranged to hold the conduit links in interfitting relation regardless of the curvature of the conduit.

4. A flexible conduit comprising a pair of end links, one having a convex spherical end wall and the other a concave spherical end wall having substantially the same radius, and interfitting intermediate links each having its opposite ends formed with convex and concave spherical walls having substantially the same radius as the said end walls of the end links, and a central substantially conical socket for the reception of a cable passing through the conduit, the several links being unattached and freely moveable upon their adjacent links whereby the length of the cable housed by the conduit will remain constant regardless of the curvature of the conduit, and an encircling coil spring connected to the end links and arranged to hold the conduit links in interfitting relation regardless of the curvature of the conduit.

5. A flexible conduit comprising a plurality of interfitting links each having its opposite ends formed with concave and convex spherical walls having substantially the same radius and joined by a central substantially conical socket formed with its wall curved on an arc of a circle substantially three times the radius of said end walls, with the center from which said last mentioned radius is struck substantially in vertical alignment with one end of the link.

6. A flexible conduit comprising a pair of centrally apertured end links, one having a convex spherical end wall and the other a concave spherical end wall having substantially the same radius, and a plurality of interfitting intermediate links each having its opposite ends formed with convex and concave spherical walls having substantially the same radius as that of said walls of the end links and joined by a central substantially conical socket formed with its wall curved on an arc of a circle substantially three times the radius of said end walls, and a coil spring arranged to encircle the intermediate links and be connected at its ends to the end links.

7. A flexible conduit comprising a pair of centrally apertured end links, one having a convex spherical end wall and the other a concave spherical end wall having substantially the same radius, and a plurality of interfitting intermediate links each having its opposite ends formed with convex and concave spherical walls having substantially the same radius as that of said walls of the end links and joined by a central substantially conical socket formed with its wall curved on an arc of a circle substantially three times the radius of said end walls, a coil spring arranged to encircle the intermediate links and be connected at its ends to the end links, and means carried by one of said links for admitting lubricant to aligned sockets of the intermediate links.

8. A flexible conduit comprising a pair of centrally apertured end links, one having a convex spherical end wall and the other a concave spherical end wall having substantially the same radius, and a plurality of interfitting intermediate links each having its opposite ends formed with convex and concave spherical walls having substantially the same radius as that of said walls of the end links and joined by a central substantially conical socket formed with its wall curved on an arc of a circle substantially three times the radius of said end walls, and a coil spring arranged to encircle the intermediate links and be connected at its ends to the end links, said spring being preliminarily shaped to straight position and arranged to press the conduit toward a straight position whenever it is bent.

9. A flexible conduit comprising a pair of centrally apertured end links, one having a convex spherical end wall and the other a concave spherical end wall having substantially the same radius, and a plurality of interfitting intermediate links each having its opposite ends formed with convex and concave spherical walls having substantially the same radius as that of said walls of the end links and joined by a central substantially conical socket formed with its wall curved on an arc of a circle substantially three times the radius of said end walls, and a cable adapted to pass through said sockets, said links being arranged to be freely movable upon their adjacent links so as to present additional surface into engagement with said cable proportionately as the conduit is bent away from straight line position.

10. A flexible conduit comprising interfitting links each having its opposite ends formed with convex and concave spherical walls and having a flared substantially conical central aperture with curved walls capable of engagement with the cable for the reception of a cable passing through the conduit, the several links being flexibly interconnected by a resilient member separate from the cable housed therein and being freely movable upon their adjacent links and arranged to occupy less space on the side toward the center of curvature than on the side remote therefrom, whereby the length of the cable housed in the conduit will remain substantially constant regardless of the curvature of the conduit.

11. A flexible force transmitting device comprising a flexible tension element, a flexible compression element, the compression element comprising interfitting links each having its opposite ends formed with convex and concave spherical walls and conforming to spheres of substantially like radii whose centers lie in the surfaces of each other and each having a central aperture for the reception of the flexible tension element, and a coil spring encircling said links and resiliently urging them together and giving lateral support to prevent kinking of the device when it is loaded.

12. A flexible force transmitting device comprising in combination a flexible conduit having end members of which at least one has an outwardly flared central aperture, said conduit also comprising interfitting links each having a curved central aperture, an encircling coil spring secured to said end members and arranged to hold said links in interfitting relation regardless of the curvature of the conduit, and a cable extending through said apertures and being longitudinally movable relative to said links and being guided in its movement at least in part by the flared aperture of said end member.

13. The combination of a flexible inextensible element, a plurality of closely associated members comprising an incompressible element relative to which said inextensible element is movable under loads in tension, said members of the incompressible element encircling said inextensible element and being loaded in compression equal to the tension of the first named element, and resilient means extending coaxial of the first named element and encircling and at least laterally engaging said members and holding them in their associated relationship.

14. A flexible conduit adapted to be loaded in compression comprising end members and an extended coil spring secured at its ends to said members, and a plurality of relatively movable closely associated parts disposed and held within the spring and between said end members, in combination with a cable carrying loads in tension and extending through the conduit and being movable longitudinally thereof, said spring laterally supporting said parts when they are loaded.

15. A flexible conduit having end members and resiliently acting normally extended spiral means joining said members and urging them toward each other, and longitudinally incompressible flexible means disposed between said members and laterally engaged and supported by said spiral means, in combination with a tension element extending through the conduit which loads the conduit in compression.

16. A flexible conduit for a cable having end members, a coil spring joining said members, and longitudinally incompressible flexible means disposed between said members and comprising a plurality of links each having a central aperture for the cable, the intersection of the wall of the aperture with an axial plane defining an arc whose radius equals the minimum radius of curvature of the axis of the conduit less substantially the radius of the cable.

17. A flexible conduit for a cable longitudinally movable therein, having a plurality of links each having a central aperture for the cable, and intersection of the wall of the aperture with an axial plane defining an arc whose radius equals the minimum radius of curvature of the axis of the conduit less substantially the radius of the cable, whereby at least in maximum curvature the cable may slide on a continuous arcuate line of support afforded by the walls of the apertures of the links.

18. A hollow flexible conduit, a cable extending therethrough and freely movable longitudinally of said conduit and not connected thereto, said conduit comprising a plurality of interfitting links each having a central generally curved conical aperture of minimum cross-sectional area at one end substantially equal to the cross-sectional area of the cable, the intersection of the walls of the aperture with axial planes of the units defining arcs whose radius equals the minimum radius of curvature of the axis of the conduit less substantially the radius of the cable.

19. The combination of hollow flexible conduit, a cable extending therethrough and freely movable longitudinally of said conduit and not connected thereto, said conduit comprising a plurality of interfitting parts which intersect the plane of curvature of the conduit in circles whose centers lie in the circumference of each other, at least some of said parts having a central generally curved conical aperture of minimum cross-sectional area substantially equal to the cross-sectional area of the cable, the intersection of the walls of the aperture with the said plane of curvature defining an arc whose radius equals the minimum radius of curvature of the axis of the conduit less substantially the radius of the cable, said arc being struck from a center lying in the plane of curvature in a line normal to the axis of the conduit at a point midway between adjacent centers of said circles.

20. A unit for flexible conduit formed with equally curved end surfaces which intersect at least one plane in the paths of circles whose centers lie in each others circumference, said unit having a central aperture whose walls intersects the same plane in an arc whose radius is a function of the minimum radius of curvature of the conduit.

21. A unit for flexible conduit having concave and convex end walls conforming to the surfaces of intersecting spheres whose centers lie in each others surfaces, said unit having a central aperture coaxial with a line joining said centers and intersecting said spheres in a large circle at the convex wall and a small circle at the concave wall and whose side walls intersect an axial plane in an arc whose radius equals the minimum radius of curvature of the conduit less the radius of the smaller circle of intersection of the aperture with one of the spheres.

22. A unit for flexible conduit having concave and convex end walls and having a central aperture coaxial with the longitudinal axis of the unit and intersecting said walls in a large closed curve at the convex wall and a small closed curve at the concave wall and whose side walls intersect an axial plane in an arc whose radius equals the minimum radius of curvature of the conduit less the radius of the smaller closed curve of intersection of the aperture with the concave wall.

23. A unit for flexible conduit having concave and convex end walls conforming to the surfaces of intersecting spheres whose centers lie in the line of the longitudinal axis of the unit and in the surfaces of each other, said unit having a central aperture with curved side walls which intersect the plane of the longitudinal axis of the unit in arcs struck from a center lying in a line which is the perpendicular bisector of that portion of the line of the axis of the unit lying between the centers of said spheres.

24. A unit for flexible conduit having a concave end wall defined by a sphere whose center lies in the longitudinal axis of the unit and having a central aperture with curved side walls which intersect axial planes in arcs struck from centers lying in a plane normal to the axis of the unit at a point removed half a radius from the center of said sphere.

25. A unit for flexible conduit having end faces conforming to intersecting spheres whose centers lie in the longitudinal axis of the unit and one of which lies in the surface of the other sphere, said unit having a side wall defining a surface of revolution tangential to both spheres.

26. A unit for flexible conduit having concave and convex end walls conforming to the surfaces of intersecting spheres of which the center of at least one lies in the surface of the other, said unit having an annular side wall lying in a surface of revolution which is tangential to both said spheres, said side walls merging into the convex end wall at one end and terminating near the concave wall at the other end to form a brim, the plane of which is spaced between the centers of the said spheres and nearer the center of the sphere defining the concave wall than the center of the sphere defining the convex wall.

27. A unit for flexible conduit having end walls conforming to the surfaces of intersecting spheres whose centers lie in the longitudinal axis of said unit in the surfaces of each other, the body of the unit lying principally within one of the spheres and having an annular portion adjacent the brim of the unit lying without both of the spheres.

28. A unit for flexible conduit having end surfaces conforming to the surfaces of intersecting spheres the centers of which lie in the longitudinal axis of the units, and having a central aperture the sides of which intersect an axial plane in an arc struck from a center which lies in a plane normal to the axis of the unit midway between the centers of said spheres, the body of the unit being generally confined within one of said spheres except for a portion lying outside of both the spheres and adjacent the plane of the centers of the arcs defining the sides of the aperture.

29. A unit for flexible conduit through which a part may move freely in curvature having concave and convex spherical end faces, a central curved conical aperture for said part and a cylindrical side wall merging with said convex end face and terminating adjacent the concave end face.

30. A flexible force transmitting device comprising in combination, a conduit having end members, extended spring means secured to said members and exerting a tension between them, hollow articulated means between the end members, and a cable extending therethrough and being relatively movable therein.

31. The combination of a cable and a longitudinally incompressible flexible conduit therefor, comprising parts with central apertures to receive the cable and having curved surfaces engaging each other, the central apertures being flared to engage the cable along continuous lines in the plane of curvature of the conduit and on the inner side thereof, the portions of said parts between the cable and the center of curvature lying in an arcuate zone whose mean length in curvature is less than the length of the cable by an amount proportionate to the difference between the radius of curvature of the cable and the mean radius of curvature of said arcuate zone, whereby the arcuate length of the cable housed within a given curved portion of conduit equals the straight line length of the cable housed within the same portion of conduit.

32. The combination of a cable acting as an inextensible tension member, a flexible conduit therefor to act as an incompressible compression member, the cable and conduit being relatively movable and comprising together a flexible force transmitting device, said conduit being formed of parts at least some of whose end surfaces are struck from spheres whose centers lie in the axis of the conduit whereby in curvature the longitudinal axis of the conduit tends to exceed in length the straight line axis of the conduit by an amount equal to the sum of the difference between the arcuate distance from center to center of said spheres and the cord distance from center to center of said spheres, at least some of said conduit parts having central apertures with side walls engaging the cable in the plane of curvature of the conduit in curved lines struck from the center of curvature of the conduit, said apertures having minimum diameter greater than the diameter of the cable to permit the cable to be drawn into a smaller arc than the curved longitudinal axis of the conduit whereby the amount of cable housed in the conduit in curvature is the same as the amount housed in the conduit in straight line regardless of the tendency of the conduit to increase in length in curvature.

33. A flexible force transmitting device comprising a flexible inextensible element movable longitudinally of and housed within a flexible incompressible element, said flexible incompressible element comprising parts loaded in compression at least in curvature, and free to move upon each other, and load bearing means encircling and laterally engaging and supporting said parts, said last named means defining a cylinder and confining said parts within said cylinder.

34. A flexible force transmitting device having a flexible tension element disposed within a flexible compression element, said compression element comprising parts loaded in compression at least in curvature, and free to move upon each other and an encircling spiral resilient element closely engaging said parts laterally and confining their movement within a cylindrical zone.

In witness whereof I hereunto set my hand.

JOHN SNEED.